W. G. TRETHEWEY.
TRACTOR PLOW.
APPLICATION FILED JULY 12, 1916.
1,245,287.
Patented Nov. 6, 1917.
2 SHEETS—SHEET 1.
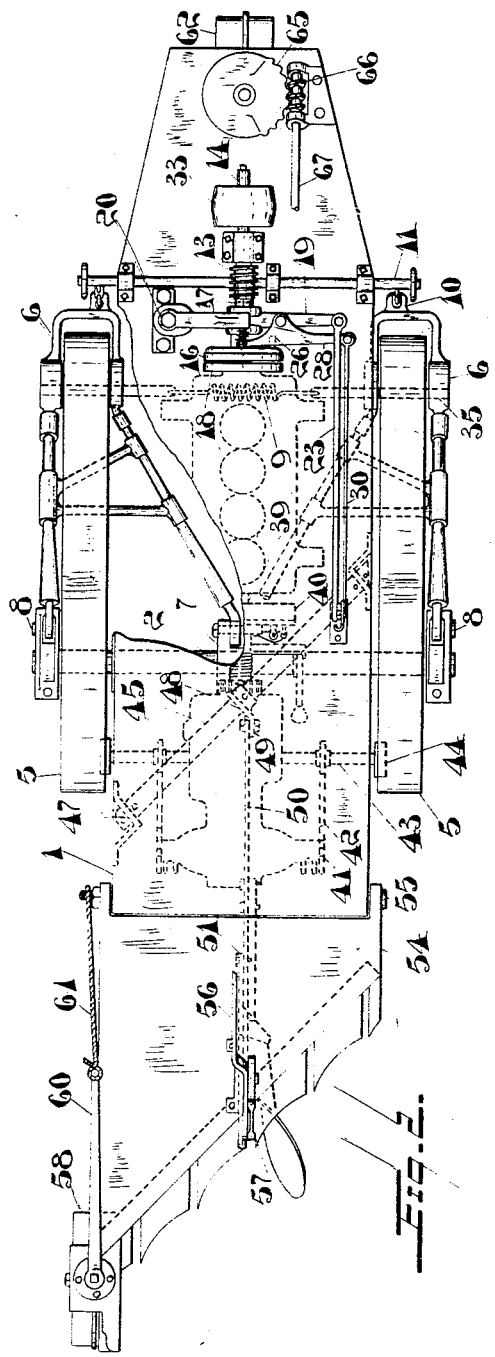
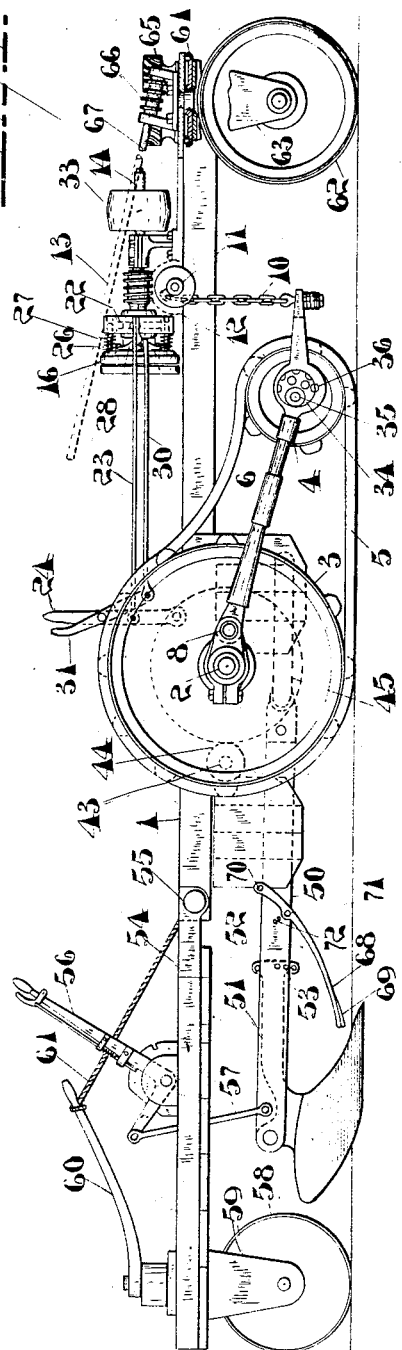
WITNESSES.
N. R. Tyndall.
E. P. Hall.
INVENTOR.
W. G. Trethewey
BY J. Edward Maybee
ATTY.

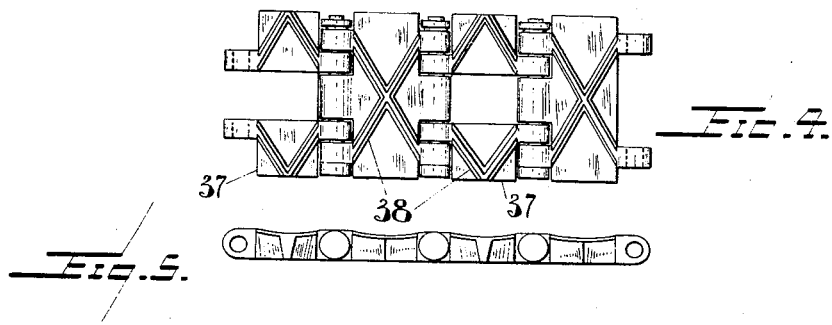
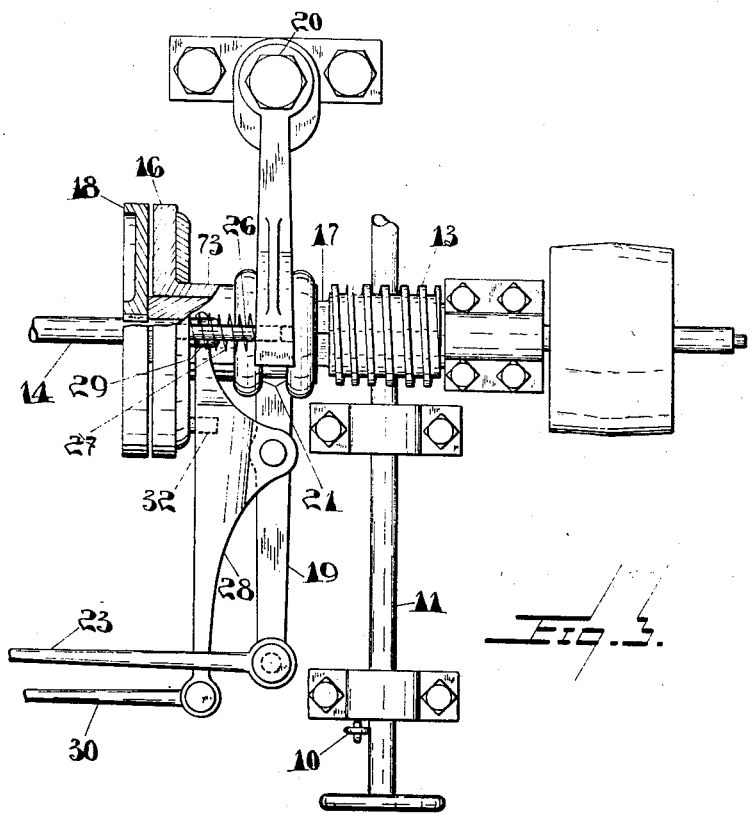

UNITED STATES PATENT OFFICE.

WILLIAM G. TRETHEWEY, OF CUCKFIELD, ENGLAND.

TRACTOR-PLOW.

1,245,287.   Specification of Letters Patent.   Patented Nov. 6, 1917.

Application filed July 12, 1916. Serial No. 108,929.

*To all whom it may concern:*

Be it known that I, WILLIAM GRIFFITH TRETHEWEY, of Cuckfield, Sussex, England, have invented certain new and useful Improvements in Tractor-Plows, of which the following is a specification.

This invention relates to tractors for plowing and other farm work, and my object is to provide a light tractor of the caterpillar type which, while possessing all the advantages of the large area of gripping and supporting surface common to that type of tractor, is yet conveniently arranged for turning in curves of short radius.

I attain the objects of my invention by means of the constructions hereinafter described and illustrated in the accompanying drawings in which—

Figure 1 is a side elevation of my improved tractor;

Fig. 2 a plan view of the same;

Fig. 3 a detail partly in section of the clutch of the mechanism for raising the idler wheels of the caterpillar traction mechanism;

Fig. 4 a plan view of the underside of part of the traction chain;

Fig. 5 a side elevation of part of the traction chain.

In the drawings like numerals of reference indicate corresponding parts in the different figures.

1 is the main frame of the tractor comprising suitable side sills, cross bars, and a platform supported thereon. The side sills carry the fixed axle 2. On this axle the drive wheels 3 are journaled preferably with roller bearings. 4 are the idler wheels and 5 traction chains, which may be of any ordinary construction, but are preferably arranged as hereinafter described.

The idler wheels 4 are independently supported so that either may rise or fall without affecting the other. Two idler-carrying frames 6 are therefore provided, preferably of tubular construction and yoke-shaped as shown. The rear ends of these frames are pivoted in front of the axle on bearing frames 7 preferably arranged to be clamped on the axle as shown. The position of the pivots 8 of the frames 6 is preferably above a line intersecting the axes of the drive and idler wheels, and consequently the distance between the axes of the drive and idler wheels increases somewhat when the idler-carrying frames are swung up, thus tightening the traction chains, which is helpful in keeping them clear of the ground when the idler wheels are raised.

Fixed axles 35 are preferably provided for the idler wheels, and these are connected by a strong coil spring 9. This spring braces the forward ends of the frames 6 and at the same time does not interfere with the independent rising and falling of the frames to permit of the idler wheels conforming to any inequalities of the surface of the ground.

My purpose in carrying the idler wheels on the frames 6 is that the traction chains may be lifted clear of the ground, except where they pass around the peripheries of the drive wheels, when it is desired to turn the apparatus in short radius as is necessary at the head lands in plowing.

For the purpose of lifting the frames 6 and holding them lifted I provide the following mechanism. A chain 10 is secured to the forward end of each frame 6. These chains are secured to the shaft 11 so that they may be wrapped around said shaft by rotating the latter. This shaft is provided with the worm wheel 12, with which meshes the worm 13 sleeved on the shaft 14 of the motor. The motor is of ordinary type and is therefore merely indicated in dotted lines.

Loose on the motor shaft 14 is a friction clutch disk 16 secured on a sleeve 73 sliding on a square shank 17 extending from the worm 13. Secured to the motor shaft 14 is a friction disk 18. It is evident that by forcing the disk 16 into contact with the disk 18 that the former will be rotated and the shaft 11 rotated to raise the frames 6. The disk 16 is moved longitudinally on the motor shaft by means of the lever 19, which is fulcrumed at 20 on the frame of the tractor and is forked to pass on opposite sides of the groove 21 formed in the sleeve 73, the parts of the lever being provided with the pins 22 engaging in the groove.

The lever 19 is actuated by means of the connecting rod 23 pivotally connected with the lever 24 suitably fulcrumed on the frame of the machine. As it is necessary not only to raise the frames 6, but also to hold them raised, I provide the disk 25. This disk is slidable on the sleeve 73 but is held from rotating by means of the pins 26, which are secured to the disk and enter holes formed in the lever 19. Coil springs 27 on the pins 26 engage the lever and the disk and yieldingly force the latter into contact with the disk 16, thus tending to hold the latter in any position to which it may be turned.

This disk 25 may be drawn out of engagement with the disk 16 to permit of its rotation by the following mechanism. A lever 28 is fulcrumed on the lever 19. This lever is forked to pass on opposite sides of the sleeve 73 and its ends are shaped to engage the studs 29 secured to the disk 25. The lever is actuated by means of a connecting rod 30 which is connected with a lever 31 fulcrumed on the lever 24. A pin 32 on the disk 25 enters a hole formed in the lever 28, and thus takes part of the strain resisting the turning of the disk 25.

The operation of the mechanism is substantially as follows: When it is desired to raise the idler-carrying frame 6, the lever 19 is drawn upon to engage the friction disk 16 with the disk 18. The shaft 11 is then rotated to raise the frames. As soon as the frames are sufficiently elevated, the lever 19 is released and the disk 16 will be held from rotation by its frictional engagement with the disk 25 and the frame is thus held raised. During this operation the friction disk 25 is preferably released from engagement with the disk 16 by actuating the lever 31. It will be noted that the handles of these levers are so located that they may be conveniently grasped by the one hand. When the frames are again to be lowered it is merely necessary to actuate the lever 31 to release the friction disk 16. The elevating mechanism is then left free to be rotated in the reverse direction as the idler-carrying frames fall.

The motor shaft is preferably provided with the pulley 33 from which power may be taken for any farm purposes.

The adjustment to take up wear in the traction chains and to give them any desired tautness is provided by means of the eccentric disks 34. In these disks the axles 35 of the idlers are secured. By rotating the disks the axles are moved to or from the drive wheels. The axles are held in any desired position by means of pins 36 which will be forced into holes formed partly in the disks and partly on the frames on which the disks are journaled, a plurality of half holes being formed in the disks adapted to register with a half hole formed in the frame.

The traction chains are formed as shown particularly in Fig. 4, alternate links 37 being formed with openings for the passage of the sprockets of the drive and idler wheels. X-shaped and V-shaped ribs 38 are formed on the links, which are suitably connected in the ordinary manner by hinge pins passing through knuckles on the links.

The motor is connected with the shaft 39 to the transmission gearing by means of a clutch 40, which may be of any ordinary type. The transmission is not illustrated in detail, as any ordinary transmission will answer the purposes of my invention. Suffice it to say that the transverse shaft 41 of the transmission gear drives, by means of sprocket gearing 42, the transverse shaft or shafts 43, which, by means of the spur gearing 44, actuate the drive wheels.

As it is my intention to make the tractor complete as a tractor plow without requiring intermediate connections, I directly connect to the side sills of the frame of the tractor the diagonal traction bar 45. Steel brackets 46 are bolted or riveted to the side sills of the main frame and the ends of the traction bar, which are preferably tubular, pass through holes in the sides of the brackets and are secured in position by pins 47.

At different points along the length of this traction bar are secured the connection pieces 48, each provided with a rearwardly directed lug 49. To these lugs are pivoted the forward ends of the draw bars 50. These traction bars are all of the same length and to the rear end of each one will be connected a plow. I show one plow so connected in the drawings.

51 is the plow beam. The rear end of the plow beam is pivotally connected with the rear end of one of the draw bars 50. The forward end of the plow beam is provided with a plurality of holes 52 arranged on the arc of a circle struck from the pivot of the plow beam. One or more holes adapted to register therewith are also formed in the traction bar. The plow may therefore be tilted to direct the points of its share more or less downwardly as desired and held as adjusted by means of the bolt 53 passed through registering holes in the plow beam and draw bar.

A platform 54 is hinged by means of the transverse hinge bar 55 to the rear end of the frame of the tractor. On this platform are mounted the pressure levers 56 which are of ordinary type and pivotally connected by means of the connecting rods 57 to each plow beam. The rear end of the platform 54 is provided with a trailer wheel 58, which has its fork 59 suitably swiveled on the frame. This wheel may be controlled by means of the arm 60 secured to the upper end of its fork stem and normally secured with the wheel in position for forward travel by means of a cord 61. When making short curves the cord may be detached and the wheel turned by the plow operator to aid the steering.

At the forward end of the main frame of the tractor is located the steering wheel 62, its fork 63 being journaled on the frame preferably by means of ball bearings 64. To the stem of the fork is secured the worm wheel 65 in which meshes a worm 66 on the suitably journaled steering shaft 67, which will, of course, be provided with the usual hand wheel.

As a colter for each plow I provide a curved shoe 68 rearwardly inclined as shown and provided with a projecting cutting rib 69 at the rear end of its under side. Each shoe is pivoted at 70 on its plow beam, and is also secured to the plow beam by means of a bolt 71 which passes through the shoe and may be engaged in any one of a plurality of holes 72 in the plow beam arranged on the arc of a circle struck with the pivot 70 as its center. These shoes 68 thus serve not only as colters, but also as shoes to regulate the depth of the furrow.

What I claim as my invention is:

1. In a tractor the combination of a main frame; a transverse axle carried thereby; brackets extending down from the frame at each side; a transverse traction bar below the axle connected at its ends to said brackets; ground wheels carried by said axle outside the frame; two independent frames pivoted adjacent the axis of said axle and above the traction bar; an idler wheel journaled on each frame; traction chains carried by the main and idler wheels; and a steering wheel supported forward of the idler wheels on the main frame.

2. In a tractor the combination of a main frame comprising longitudinal side members suitably cross connected; a transverse axle secured to said frame; ground wheels journaled on said axle outside the frame; brackets secured to the outer ends of the axle and to the axle between the side members of the frame; two independent forked frames each having its rearward ends pivoted on two of said brackets one inside of and the other outside of a ground wheel; an idler wheel journaled on each frame; traction chains carried by the main and idler wheels; and a steering wheel supported forward of the idler wheels on the main frame.

3. In a tractor, the combination of a main frame; a pair of main drive or ground wheels journaled thereon; two independent frames pivoted adjacent the axis of the driving wheel; an idler wheel journaled on each frame; traction chains carried by the main and idler wheels; and a spring connection between the free ends of the two pivoted frames.

4. In a tractor the combination of a main frame comprising longitudinal side members suitably cross connected; a transverse axle carried thereby; a transverse traction bar secured to the side members of the frame below the axle; ground wheels carried by said axle outside the frame; pivoted frames adapted to swing substantially radial to the axle; an idler wheel journaled on each frame; traction chains carried by the main and idler wheels; and a steering wheel supported forward of the idler wheels on the main frame.

5. In a tractor the combination of a main frame comprising longitudinal side members suitably cross connected; a transverse axle carried thereby; two brackets extending down from the frame one on one side in front of the axle; a transverse traction bar connected at its ends to said brackets; ground wheels carried by said axle outside the frame; pivoted frames adapted to swing substantially radial to the axle and above the traction bar; an idler wheel journaled on each frame; traction chains carried by the main and idler wheels; a motor for the tractor carried on the main frame; means for utilizing the power of the motor to raise the idler wheel frames including flexible connections with said frames; and a steering wheel supported forward of the idler wheels on the main frame.

6. In a tractor the combination of a main frame comprising longitudinal side members suitably cross connected; a transverse axle carried thereby; a transverse traction bar secured to the side members of the frame below the axle; ground wheels carried by said axle outside the frame; two independent forked frames each having its rearward ends pivoted adjacent the axis at opposite sides of one of the ground wheels and of the adjacent side member of the main frame; an idler wheel journaled on the forward part of each frame; traction chains carried by the main and idler wheels; a motor for the tractor carried on the main frame; means for utilizing the power of the motor to raise the idler wheel frames including flexible connections with said frames; and a steering wheel supported forward of the idler wheels on the main frame.

Signed at Toronto, Canada this 5th day of July, 1916.

WILLIAM G. TRETHEWEY.